US009991592B1

(12) United States Patent
Rowell et al.

(10) Patent No.: US 9,991,592 B1
(45) **Date of Patent: *Jun. 5, 2018**

(54) TEST ARRANGEMENT AND TEST METHOD

(71) Applicant: Rohde & Schwarz GmbH & Co. KG, München (DE)

(72) Inventors: Corbett Rowell, München (DE); Vincent Abadie, Hohenschäftlarn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/655,335

(22) Filed: Jul. 20, 2017

(51) Int. Cl.
*H04B 17/00* (2015.01)
*H01Q 3/26* (2006.01)
*H01Q 1/12* (2006.01)

(52) U.S. Cl.
CPC ............. *H01Q 3/267* (2013.01); *H01Q 1/125* (2013.01)

(58) Field of Classification Search
CPC ........ H01Q 3/267; H01Q 1/125; H04B 17/00; H04B 17/11; H04B 17/12
See application file for complete search history.

(56) References Cited

U.S. PATENT DOCUMENTS 7,477,877 B2 1/2009 Bednasz et al.
9,322,864 B2 4/2016 Foegelle
9,780,890 B2 10/2017 Pauly et al.
2008/0056340 A1 3/2008 Foegelle
2013/0141287 A1* 6/2013 Pallonen .............. G01R 29/105 343/703
2014/0141726 A1* 5/2014 Schlub ............... G01R 29/0857 455/67.12
2016/0233970 A1* 8/2016 Reed ...................... H04B 17/29
2016/0359573 A1* 12/2016 Pauly ..................... H04B 17/12
2017/0223559 A1* 8/2017 Kong .................. H04B 7/0413

OTHER PUBLICATIONS

Non-Final Rejection for U.S. Appl. No. 15/655,328, dated Dec. 15, 2017, 5 pages.

* cited by examiner

*Primary Examiner* — Nguyen Vo
(74) *Attorney, Agent, or Firm* — Westman, Champlin & Koehler, P.A.

(57) ABSTRACT

A test arrangement for testing a device under test, the test arrangement comprises a measurement antenna system comprising a number of measurement antenna elements for measuring signals emitted by the device under test or emitting test signals to the device under test, a link antenna for communication with the device under test, and a mechanical antenna positioning structure that carries the link antenna and controllably moves the link antenna around the device under test, wherein for positions of the link antenna around device under test that are occupied by the measurement antenna system, the measurement antenna system simulates the link antenna.

18 Claims, 4 Drawing Sheets

TEST ARRANGEMENT AND TEST METHOD

TECHNICAL FIELD

The present invention relates to a test arrangement for testing a device under test. The present invention further relates to a respective test method.

BACKGROUND

Although applicable in principal to any wireless test system, the present invention and its underlying problem will be hereinafter described in combination with testing of beamforming of wireless devices.

In modern wireless communication systems the communication between the single devices is optimized by beamforming or beamsteering.

During development or production of devices for such communication systems it is therefore necessary to thoroughly test the beamsteering capabilities of the devices for compliance with communication standards and legal regulations.

Especially with beamforming devices it is therefore necessary to position the test antennas in a plurality of different positions around the respective device under test.

Against this background, the problem addressed by the present invention is to provide a versatile test equipment for beamforming capable devices.

SUMMARY

The present invention solves this object by a test arrangement with the features of claim 1 and a test method with the features of claim 10.

Accordingly it is provided:

A test arrangement for testing a device under test, the test arrangement comprising a measurement antenna system comprising a number, i.e. one or more, of measurement antenna elements for measuring signals emitted by the device under test or emitting test signals to the device under test, a link antenna for communication with the device under test, and a mechanical antenna positioning structure that carries the link antenna and controllably moves the link antenna around the device under test, wherein for positions of the link antenna around device under test that are occupied by the measurement antenna system, the measurement antenna system simulates the link antenna.

Further it is provided:

A test method for testing a device under test, the test method comprising measuring signals emitted by the device under test or emitting test signals to the device under test with a measurement antenna system comprising a number of measurement antenna elements, communication with the device under test with a link antenna, carrying the link antenna and controllably moving the link antenna around the device under test with a mechanical antenna positioning structure, and simulating the link antenna with the measurement antenna system for positions of the link antenna around device under test that are occupied by the measurement antenna system.

As explained above, with beamforming devices it is important to measure the emissions of the device from a plurality of different positions. The present invention is especially based on the fact that a beamforming device will comprise an antenna diagram with a main lobe into a desired direction and with a number of side lobes into other directions.

For compliance measurements of such beamforming devices it is therefore necessary to measure not only the main lobe but also the side lobes that are produced by the device under test. These measurements further have to be performed for all or at least a plurality of possible beamsteering configurations of the device under test.

The present invention therefore provides a link antenna that provides a communication link to the device under test. The device under test will therefore focus the main lobe onto the link antenna to establish the communication link or keep up the communication link. Further, the communication link via the link antenna may e.g. be used to indicate to the device under test the position of the link antenna and therefore the required beamsteering parameters.

At the same time the measurement antenna system may then measure the emissions of the device under test, while the device under test keeps up the communication link and steers the main lobe towards the link antenna.

A test may then consist in moving or rotating the link antenna around the device under test, e.g. on a circular circumference. However, if the link antenna rotates on a full circle around the device under test it may also move into a position that is occupied by the measurement antenna system.

The link antenna will therefore either be occluded by the measurement antenna system or vice versa or the link antenna will collide with the measurement antenna system.

However, the emissions of the device under test should also be measured when the link antenna is positioned where the measurement antenna system is positioned, i.e. the main lobe should point towards the measurement antenna system. For this case the present invention provides the measurement antenna system with the ability to simulate the link antenna. This means that the link antenna will not move into the position of the measurement antenna system. Instead, the measurement antenna system will take over the function of the link antenna while the main lobe moves over the position of the measurement antenna system. When the main lobe as emitted by the device under test leaves the position of the measurement antenna system, the link antenna may again take over the communication with the device under test.

It is understood, that while the measurement antenna system takes over the communication with the device under test to steer the main lobe accordingly, the measurement antenna system still performs the measurements as required.

Therefore, with the present invention it is possible to measure signals emitted by the DUT at the full circumference of the device under test. With the ability of the measurement antenna system to simulate the link antenna, this is possible even if the link antenna would be positioned behind or before the measurement antenna system.

Further, with the measurement antenna system being configured to emit test signals to the device under test, it is further possible to evaluate the behavior of the device under test, and especially the connection or communication to the link antenna. The measurement antenna system may e.g. emit disturbance or interferences signals to the device under test and the link antenna may at the same time communicate with the device under test. It is then possible to evaluate the quality of the signal transmission between the link antenna and the device under test.

Therefore, comprehensive tests or measurements may be performed on the device under test without any gaps in the measurements.

Further embodiments of the present invention are subject of the further subclaims and of the following description, referring to the drawings.

In a possible embodiment, the test arrangement may comprise a measurement controller that may be communicatively coupled to the mechanical antenna positioning structure and the measurement antenna system for controlling the position of the link antenna and for controlling the measurement antenna system to simulate the link antenna for positions of the link antenna around the device under test that are occupied by the measurement antenna system.

The measurement controller may be a control device, e.g. a control computer, that controls, manages or performs the respective test or measurement of the device under test. The measurement controller may e.g. comprise a step-wise description of the test to be performed and execute the single steps one after the other. Such a description may e.g. define at which positions the link antenna should be placed consecutively and what data should be communicated to the device under test.

The description may also define properties of the signals that are expected to be measured by the measurement antenna system. This may allow the measurement controller to verify or qualify the measured signals.

The measurement controller may e.g. be coupled to the mechanical positioning structure and control the position of the link antenna via control signals to the mechanical positioning structure. It is understood, that the mechanical positioning structure may e.g. comprise an electric motor that may rotate the link antenna around the device under test. The mechanical positioning structure may further comprise a mechanical structure that carries the link antenna and is coupled to the electric motor to transfer a rotation of the electric motor into a movement of the link antenna.

In a possible embodiment, the test arrangement may comprise a communication controller that may be communicatively coupled to the link antenna for performing communication with the device under test.

The communication controller may e.g. comprise a signal processor for processing the communication signal from and to the device under test. The communication controller may further comprise any additional elements, like e.g. digital-to-analog converters, analog-to-digital converters, filters, attenuators, amplifiers and the like, that are necessary for performing the communication with the device under test via the link antenna. The communication controller may therefore act as or comprise a communication signal generator.

In a possible embodiment, the communication controller may be communicatively coupled to the measurement antenna system for providing the measurement antenna system with signals to be emitted to the device under test.

The communication controller may also provide the measurement antenna system with communication signals to be emitted by the measurement antenna system. Especially for simulating the link antenna the antenna measurement system needs to be provided with the same signals as the link antenna would be provided. In addition, the communication controller may also be coupled to the measurement antenna system to receive the signals that are received by the measurement antenna system. The communication controller may then perform evaluation of the received signals and e.g. verify if the received signals match the expected signals.

As already explained above, the measurement antenna system may also emit disturbance or interference signals to the device under test. Such signals serve to test the behavior of the device under test, especially the communication to the link antenna, under such influences. The communication controller may therefore also provide such interference or disturbance signals to the measurement antenna system, while performing communication with the device under test via the link antenna.

It is however understood, that a dedicated device may be provided that may be connected to the measurement antenna system and evaluate the signals received by the measurement antenna system or generate the signals emitted by the measurement antenna system. Such a dedicated device may be connected to the communication controller to provide the results of the signal evaluation to the communication controller or to receive control data from the communication controller. The control data may e.g. control the dedicated device to generate signals that may then be emitted by the measurement antenna system.

In a possible embodiment, the measurement antenna system may comprise an antenna array with a plurality of measurement antenna elements, wherein the measurement antenna elements may be individually switchable from a test mode to a communication mode.

An antenna array may be beneficially used to measure the emissions of the device under test, since the antenna array with the plurality of measurement antenna elements covers a larger surface than a single antenna. The antenna array may also be used to emit signals to the device under test and especially to simulate specific types of signals. The antenna array may e.g. be used to perform beamforming or beamsteering and therefore emit specific signals to the device under test. To perform beamsteering or beamforming, the measurement antenna system may e.g. comprise phase shifters that are coupled to the single measurement antenna elements and a phase controller. The phase controller may e.g. control the phase delay that is introduced into the source signals of the single measurement antenna elements.

The single measurement antenna elements are individually switchable from a test mode to a communication mode and vice versa. Therefore, the theoretical path of the link antenna may be simulated by consecutively switching the respective measurement antenna elements into the communication mode that are on or most proximate to the theoretical path of the link antenna. The remaining measurement antenna elements may however still be operated in the test mode and measure the signal emitted by the device under test. Meanwhile the communication is actively performed by the respective one of the measurement antenna elements that is operated in the communication mode.

Depending on the frequencies used for communication with the device under test, different antennas may be used. For example in the GHz frequency range microstrip antennas or the like may be used as measurement antenna elements and/or as link antenna.

In a possible embodiment, the measurement antenna system may comprise for every measurement antenna element a switching element that may be connected on an output port to the respective measurement antenna element and that may be connected on a first input port to a measurement device and on a second input port to the communication controller.

The switching elements may couple either the first input port to the output port or the second input port to the output port. This means that the respective measurement antenna element is either connected to the measurement device or to the communication controller.

The measurement device may be any type of measurement device, like e.g. a vector network analyzer, an oscilloscope or the like. The measurement device may also be a multi-port measurement device that comprises an input port for every one of the measurement antenna elements.

The communication controller may e.g. comprise a signal output and a signal generation controller, e.g. a digital signal processor or the like, that is coupled to the signal output. It is understood, that the communication controller may also comprise e.g. digital to analog converters, filters, amplifiers, attenuators or any other element that is necessary to perform the communication with the device under test. Such elements may be coupled between the signal generation controller and the signal output. The signal generation controller may e.g. comprise a computer program that manages the communication with the device under test. Such a computer program may e.g. implement a communication stack according to a communication protocol used by the device under test to communicate data with the device under test.

In case that the device under test comprises a mobile or cell phone, the communication controller may e.g. comprise or simulate the communication section of a base station of the respective communication protocol.

In a possible embodiment, the switching elements may comprise signal duplexers with three ports.

Duplexers are electronic devices that allow bi-directional (duplex) communication over a single path. For example in radio communications systems a duplexer may isolate the receiver from the transmitter while permitting them to share a common antenna. Passive duplexers may be provided that do not require specific switching signals. Such passive duplexers automatically perform signal routing depending on the port on which the respective signal is received.

In the test arrangement a duplexer may be provided for the single measurement antenna elements. The first input port of the duplexer could be coupled to the measurement device and the second input port of the duplexer could be coupled to the communication controller. The third or output port of the duplexer could be coupled to the respective measurement antenna element.

The duplexer would then forward signals received by the antenna to the first input port. Signals provided at the second input port to the duplexer would be provided to the respective measurement antenna element for emission.

Therefore, single measurement antenna elements would not need to be actively switched from one operating mode to the other. Instead any antenna element could be used in test mode and the communication mode at the same time. A measurement antenna element could simply be used as emitting antenna, i.e. for simulating the link antenna, by providing the respective communication signal from the communication controller to the second input port of the respective duplexer.

It is understood, that the communication controller need not be a dedicated communication controller. Instead, the communication controller may be the same communication controller that also generates and receives the communication signals for the link antenna.

Since every single measurement antenna element may be put into a communication mode or a test mode, it is possible to simulate the link antenna with single measurement antenna elements or groups of measurement antenna elements.

In a possible embodiment, the test arrangement may comprise a mechanical device positioning structure that may carry the device under test and controllably rotates and/or translates, i.e. in one, two or three axis, the device under test.

The mechanical device positioning structure may e.g. comprise a controllably rotating plate that may in addition be elevated. The mechanical device positioning structure may e.g. comprise electric motors that allow for an automatic positioning of the device under test.

With the mechanical device positioning structure it is possible to rotate and/or move the device under test relative to the measurement antenna system and the link antenna. The test arrangement therefore allows performing measurements on the device under test very flexibly.

In a possible embodiment, the mechanical antenna positioning structure may move the link antenna around the device under test on a circular circumference or on a spherical circumference.

The mechanical antenna positioning structure may e.g. comprise a beam that is coupled to an electric motor on one end and carries the link antenna on the other end. A rotation of the axis of the electric motor would result in the link antenna moving on a circular circumference, i.e. a 2D movement, around the axis of the electric motor. The electric motor could e.g. be positioned under the device under test. It is understood, that more complex mechanical constructions may be used that allow positioning the electric motor off-center, i.e. not under the device under test. Such constructions may comprise e.g. gears, belts, guides and slides for the link antenna or the like.

If the link antenna is to be moved in a spherical circumference, i.e. a 3D movement, a gimbal or cardan style structure may be used to carry the link antenna.

As an alternative a robot arm like structure with one or more joints may also be used to carry the link antenna.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
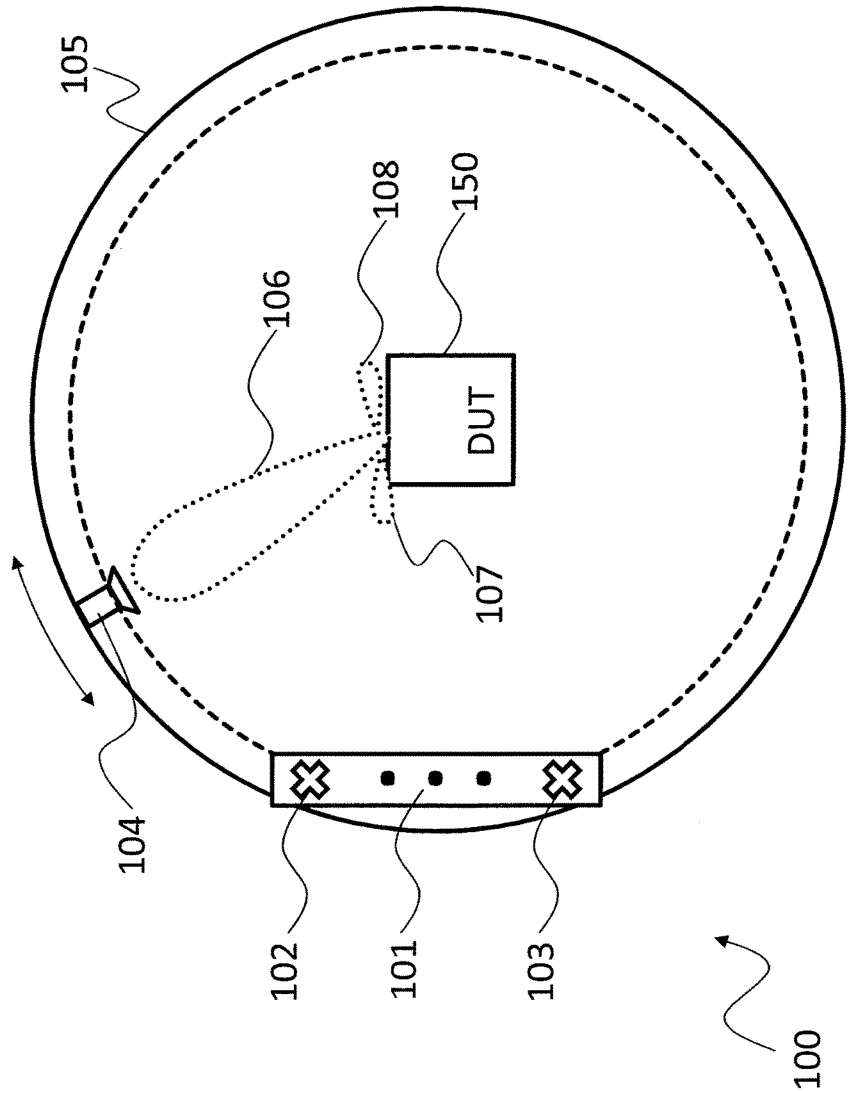
FIG. 1 shows a block diagram of an embodiment of a test arrangement according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of a test arrangement 100. The test arrangement 100 comprises a measurement antenna system 101. The measurement antenna system 101 comprises a number of measurement antenna elements 102, 103. It is understood, that although two measurement antenna elements 102, 103 are exemplarily shown, the measurement antenna system 101 may comprise any number, i.e. one or more, of measurement antenna elements 102, 103.

The test arrangement 100 further comprises a link antenna 104 that is mounted on a mechanical antenna positioning structure 105. The mechanical antenna positioning structure 105 moves the link antenna 104 around a device under test 150 on a circle or a circular circumference. It is understood, that the test arrangement 100 is shown in a top-down view and that the circular circumference is also shown in a top-down view. The circular circumference is therefore a two-dimensional circumference. It is further understood, that the mechanical antenna positioning structure 105 may also move the link antenna 104 on a spherical circumference, i.e. a three-dimensional circumference.

Although not explicitly shown, it is understood, that the mechanical antenna positioning structure 105 may e.g. comprise a circular guide. The link antenna 104 may e.g. be mounted on a slide that moves on the guide. For a movement on a spherical circumference, the guide may be rotatably mounted, e.g. similar to a gimbal.

The link antenna 104 serves to establish a link to the device under test 150. Establishing a link refers to actively communicating with the device under test 150. If the device under test 150 for example is a mobile phone, actively communicating may refer to simulating a communication partner, e.g. a base station or another mobile phone and performing communication with the device under test 150. Such communication may include establishing the link between the device under test 150 and the communication partner. The communication may however also comprise performing e.g. a voice call or data transmission. It is understood, that as alternative or in addition a dedicated test mode may be provided in the device under test 150 that enables predetermined test transmission in the device under test 150. Such test transmissions may e.g. comprise emitting a test signal to the position of the link antenna 104 and following the position of the link antenna 104 with the test signal. "To the position of the link antenna 104" in this context refers to the device under test 150 performing beamforming or beamsteering to focus the main lobe of the emissions of the device under test 150 onto the link antenna 104. The device under test 150 may e.g. monitor the position of the link antenna 104 based on signal emissions of the link antenna 104 to the device under test 150.

In addition or as alternative, the communication from the link antenna 104 to the device under test 150 may be used to transmit position information to the device under test 150 or directly command the device under test 150 to steer the main lobe of the emissions into a specific direction.

It is indicated in FIG. 1 that the device under test 150 may emit a main lobe 106 in the direction of the link antenna 104. However, at the same time the device under test 150 will also emit side lobes 107, 108 (only two are exemplarily shown). When moving the link antenna 104 around the device under test 150 and following the link antenna 104 with the main lobe 106 the measurement antenna system 101 may measure the emissions of the device under test 150 in other directions as the direction of the main lobe 106. It is also possible to rotate the link antenna 104 around the device under test 150 and rotate the device under test 150 at the same time such that the beamsteering in the device under test 150 is not modified during the rotation.

Although not shown in the test arrangement 100, it is understood, that dedicated controllers and measurement devices may be provided that perform and control the communication with the device under test 150.

In FIG. 1 it is indicated by a double headed arrow that the link antenna 104 may move on a circular circumference around the device under test 150. It is obvious, that the link antenna 104 will eventually arrive at the position of the measurement antenna system 101. There the link antenna 104 will either collide with the measurement antenna system 101, be occluded by the measurement antenna system 101 or occlude the measurement antenna system 101. Therefore, for positions that are occupied by the measurement antenna system 101, either no communication between the link antenna 104 and the device under test 150 may be performed or the measurement antenna system 101 may not perform measurements as required.

In the test arrangement 100 the measurement antenna system 101, especially the measurement antenna elements 102, 103, may therefore take over the task of communicating with the device under test 150 for the positions that may not be accurately covered by the link antenna 104.

This means that for these positions, one or more of the measurement antenna elements 102, 103 may take over the communication with the device under test 150. The measurement antenna elements 102, 103 may e.g. be used to perform beamforming to simulate the radial line-of-sight between the link antenna 104 and the device under test 150. It is further understood, that the measurement antenna elements 102, 103 that do not simulate the link antenna 104 may continue to measure the signals emitted by the device under test 150 and/or emit interference signals to the device under test 150.

Figure 2:
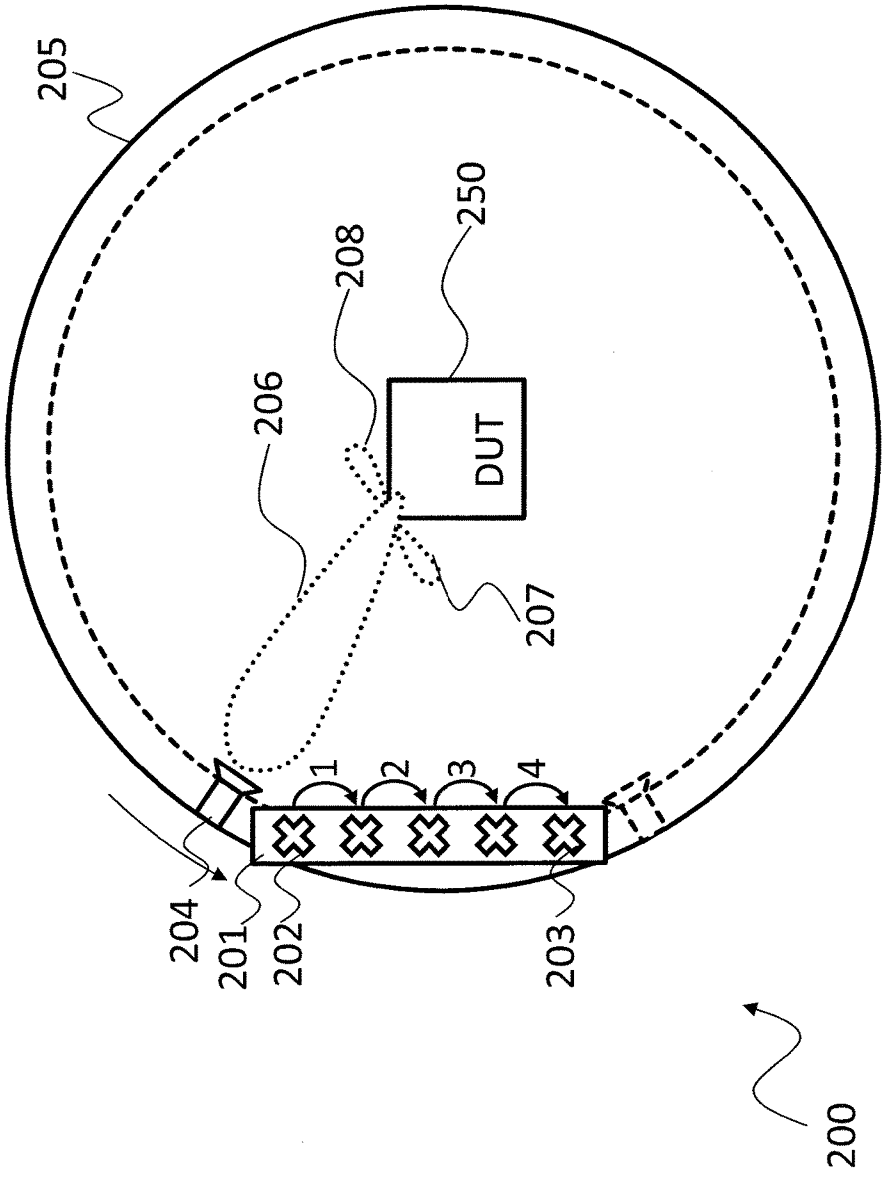
FIG. 2 shows a block diagram of another embodiment of a test arrangement according to the present invention.

FIG. 2 shows a block diagram of a test arrangement 200. The test arrangement 200 is based on the test arrangement 100. Therefore, the test arrangement 200 also comprises a measurement antenna system 201 with four measurement antenna elements 202, 203 (for sake of clarity only the first and last are provided with reference signs). The test arrangement 200 also comprises a link antenna 204 that may move on a mechanical antenna positioning structure 205 around the device under test 250.

In the test arrangement 200 the link antenna 204 moves counter-clock-wise and reaches the position of the measurement antenna system 201.

In this moment the first one of the measurement antenna elements 202, 203 may take over the communication function from the link antenna 204. To simulate further movement of the link antenna 204, after the first one of the measurement antenna elements 202, 203 the second one of the measurement antenna elements 202, 203 takes over the communication function. Then the third one of the measurement antenna elements 202, 203 takes over the communication function and finally, the fourth one of the measurement antenna elements 202, 203 takes over the communication function. Meanwhile the link antenna 204 may move to the other end of the measurement antenna system 201. After the fourth one of the measurement antenna elements 202, 203 performed the communication function, the link antenna 204 may therefore take over the communication function again.

It is understood, that as already indicated above, the measurement antenna elements 202, 203 may also be used to perform beamforming to simulate the radial orientation of the link antenna 204 to the device under test 150.

As an alternative, the measurement antenna system 201 may be provided with a curved shape that follows the circular circumference of the mechanical antenna positioning structure 205.

It can be seen in FIG. 2 that the present invention allows performing comprehensive measurements with the device under test 250, without gaps caused by the measurement antenna system 201.

Figure 3:
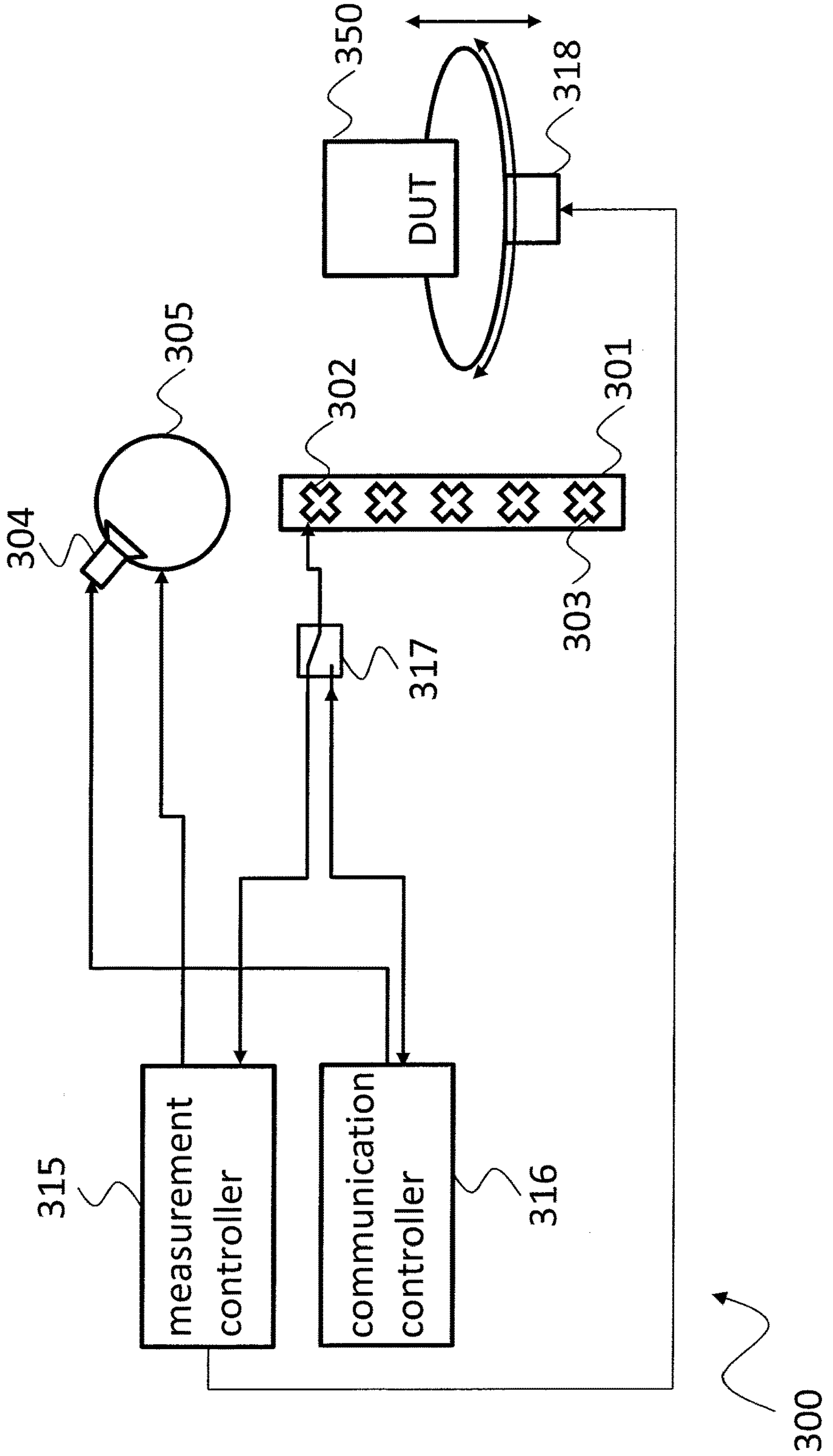
FIG. 3 shows a block diagram of another embodiment of a test arrangement according to the present invention.

FIG. 3 shows a block diagram of a test arrangement 300. The test arrangement 300 focuses on the control and measurement side and does therefore not explicitly show the mechanical arrangements as shown in FIGS. 1 and 2. It is however understood, that the below explanations and the elements of the test arrangement 300 may be combined with any element of the test arrangement 100 and/or the test arrangement 200.

The test arrangement 300 comprises a measurement controller 315 and a communication controller 316. The measurement controller 315 is coupled to the mechanical antenna positioning structure 305 and the measurement antenna system 301. The measurement controller 315 may control the position of the link antenna 304 via the mechanical antenna positioning structure 305 and may also receive the signals received by the measurement antenna system 301, e.g. to evaluate the received signals.

The communication controller 316 is coupled to the link antenna 304 to perform the communication with the device under test 350. As already explained above, the function of the link antenna 304 in certain circumstances is performed by some of the measurement antenna elements 302, 303 of the measurement antenna system 301. Therefore, the communication controller 316 is also coupled to the measurement antenna elements 302, 303.

Because the measurement antenna elements 302, 303 may be coupled either to the measurement controller 315 or the communication controller 316, a switching element 317 is provided for every measurement antenna elements 302, 303. For sake of clarity, the switching element 317 is only shown exemplarily for the measurement antenna element 302. It is however understood, that such a switching element may be provided for every one of the measurement antenna elements 302, 303.

As may be seen, the switching element 317 comprises two input ports and one output port. The output port is coupled to the respective measurement antenna element 302, 303. One input port is coupled to the measurement controller 315. In a test mode, the respective measurement antenna element 302, 303 may therefore provide received signals to the measurement controller 315 or receive disturbance signals from the measurement controller 315 and emit them to the device under test 350. In a communication mode, the respective measurement antenna element 302, 303 may be connected to the communication controller 316 via the switching element 317. In this case, the respective measurement antenna element 302, 303 may receive communication signals from the communication controller 316 and provide received communication signals to the communication controller 316.

The switching elements 317 may comprise signal duplexers with three ports. Such signal duplexers may be provided as passive devices, where no control of the switching process is necessary.

Although not explicitly shown, it is understood, that the switches may e.g. be controlled by the measurement controller 315 or the communication controller 316. As an alternative, a dedicated switching controller may also be provided.

If the measurement antenna system 301 is used to perform beamforming, additional phase shifters may be provided in the signal lines to the measurement antenna elements 302, 303. These phase shifters may then also be controlled either by the measurement controller 315 or the communication controller 316.

The test arrangement 300 further comprises a mechanical device positioning structure 318. The mechanical device positioning structure 318 may rotatably move the device under test 350 and elevate the device under test 350. The movement of the device under test 350 may also be controlled by the measurement controller 315 or the communication controller 316.

It is understood, that the measurement controller 315, the communication controller 316 or any other of the above mentioned controllers may be implemented as hardware, software or any combination of hardware and software. Such a device may e.g. comprise a processor that comprises D/A converters and A/D converters or is coupled to D/A converters and A/D converters for sending and receiving wireless signals. Further, such a processor may comprise digital I/O ports or pins or a digital bus interface that may serve to communicate with the mechanical antenna positioning structure 305 and/or the mechanical device positioning structure 318 and/or the switching elements 317.

Figure 4:
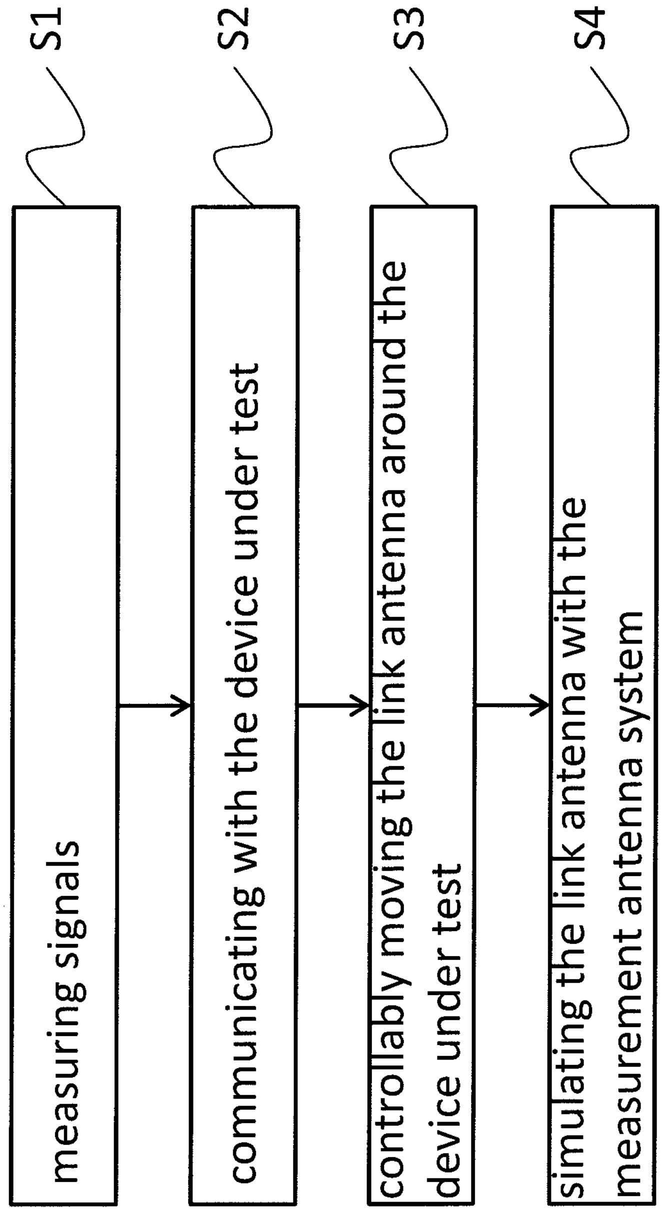
FIG. 4 shows a block diagram of an embodiment of a test method according to the present invention.

For sake of clarity in the following description of the method based FIG. 4 the reference signs used above in the description of apparatus based FIGS. 1-3 will be maintained. FIG. 4 shows a block diagram of a test method for testing a device under test.

The test method comprises measuring S1 signals emitted by the device under test 150, 250, 350 or emitting test signals to the device under test 150, 250, 350 with a measurement antenna system 101, 201, 301 comprising a number of measurement antenna elements 102, 103, 202, 203. Further, the method comprises communicating S2 with the device under test 150, 250, 350 with a link antenna 104, 204, 304, carrying the link antenna 104, 204, 304 and controllably moving S3 the link antenna 104, 204, 304 around the device under test 150, 250, 350 with a mechanical antenna positioning structure 105, 205, 305. Further, the method comprises simulating S4 the link antenna 104, 204, 304 with the measurement antenna system 101, 201, 301 for positions of the link antenna 104, 204, 304 around device under test 150, 250, 350 that are occupied by the measurement antenna system 101, 201, 301.

The test method may further comprise controlling the position of the link antenna 104, 204, 304 and/or controlling the measurement antenna system 101, 201, 301 to simulate the link antenna 104, 204, 304 for positions of the link antenna 104, 204, 304 around the device under test 150, 250, 350 that are occupied by the measurement antenna system 101, 201, 301, especially with a measurement controller 315 that is communicatively coupled to the mechanical antenna positioning structure 105, 205, 305 and the measurement antenna system 101, 201, 301.

The test method may further comprise performing communication with the device under test 150, 250, 350, especially with a communication controller 316 that is communicatively coupled to the link antenna 104, 204, 304.

The test method may further comprise providing the measurement antenna system 101, 201, 301 with signals to be emitted to the device under test 150, 250, 350, especially with the communication controller 316 being communicatively coupled to the measurement antenna system 101, 201, 301.

Further, the measurement antenna system 101, 201, 301 may comprise an antenna array with a plurality of measurement antenna elements 102, 103, 202, 203. The test method may comprise individually switching the measurement antenna elements 102, 103, 202, 203 from a test mode to a communication mode to simulate the link antenna 104, 204, 304.

The measurement antenna system 101, 201, 301 may further comprise for every measurement antenna element 102, 103, 202, 203 a switching element 317 that is connected on an output port to the respective measurement antenna element 102, 103, 202, 203 and that is connected on a first input port to a measurement device and on a second input port to the communication controller. Individually switching may be performed by controlling the respective switching element 317.

The switching elements 317 may comprise signal duplexers with three ports. Such signal duplexers may be provided as passive devices, where no switching is necessary.

The test method may comprise carrying the device under test 150, 250, 350 and controllably rotating and/or translating the device under test 150, 250, 350, especially with a mechanical device positioning structure 318. Further, the test method may comprise moving the link antenna 104, 204, 304 around the device under test 150, 250, 350 on a circular circumference or on a spherical circumference, especially with the mechanical antenna positioning structure 105, 205, 305.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS

100, 200 test arrangement
101, 201, 301 measurement antenna system
102, 103, 202, 203 measurement antenna element
104, 204, 304 link antenna
105, 205, 305 mechanical antenna positioning structure
106, 107, 108 signal lobes
206, 207, 208 signal lobes
315 measurement controller
316 communication controller
317 switching element
318 mechanical device positioning structure
150, 250, 350 device under test

The invention claimed is:

1. A test arrangement for testing a device under test, the test arrangement comprising:

a measurement antenna system comprising a number of measurement antenna elements for measuring signals emitted by the device under test or emitting test signals to the device under test, a link antenna for communication with the device under test, and a mechanical antenna positioning structure that carries the link antenna and controllably moves the link antenna around the device under test, wherein for positions of the link antenna around device under test that are occupied by the measurement antenna system, the measurement antenna system simulates the link antenna.

2. The test arrangement according to claim 1, comprising a measurement controller that is communicatively coupled to the mechanical antenna positioning structure and the measurement antenna system for controlling the position of the link antenna and for controlling the measurement antenna system to simulate the link antenna for positions of the link antenna around the device under test that are occupied by the measurement antenna system.

3. The test arrangement according to claim 1, comprising a communication controller that is communicatively coupled to the link antenna for performing communication with the device under test.

4. The test arrangement according to claim 3, wherein the communication controller is communicatively coupled to the measurement antenna system for providing the measurement antenna system with signals to be emitted to the device under test.

5. The test arrangement according to claim 4, wherein the measurement antenna system comprises for every measurement antenna element a switching element that is connected on an output port to the respective measurement antenna element and that is connected on a first input port to a measurement device and on a second input port to the communication controller, wherein the measuring device is arranged and configured such to measure signals emitted by the device under test.

6. The test arrangement according to claim 5, wherein the switching elements comprise signal duplexers with three ports.

7. The test arrangement according to claim 1, wherein the measurement antenna system comprises an antenna array with a plurality of measurement antenna elements, wherein the measurement antenna elements are individually switchable from a test mode to a communication mode.

8. The test arrangement according to claim 1, comprising a mechanical device positioning structure that carries the device under test and controllably rotates and/or translates the device under test.

9. The test arrangement according to claim 1, wherein the mechanical antenna positioning structure moves the link antenna around the device under test on a circular circumference or on a spherical circumference.

10. A test method for testing a device under test, the test method comprising:

measuring signals emitted by the device under test or emitting test signals to the device under test with a measurement antenna system comprising a number of measurement antenna elements, communicating with the device under test with a link antenna, carrying the link antenna and controllably moving the link antenna around the device under test with a mechanical antenna positioning structure, and simulating the link antenna with the measurement antenna system for positions of the link antenna around device under test that are occupied by the measurement antenna system.

11. The test method according to claim 10, comprising controlling the position of the link antenna and/or controlling the measurement antenna system to simulate the link antenna for positions of the link antenna around the device under test that are occupied by the measurement antenna system.

12. The test method according to claim 10, comprising performing communication with the device under test.

13. The test method according to claim 12, comprising providing the measurement antenna system with signals to be emitted to the device under test.

14. The test method according to claim 13, wherein the measurement antenna system comprises for every measurement antenna element a switching element that is connected on an output port to the respective measurement antenna element and that is connected on a first input port to a measurement device and on a second input port to the communication controller, wherein individually switching is performed by controlling the respective switching element, wherein the measuring device is arranged and configured such to measure signals emitted by the device under test.

15. The test method according to claim 14, wherein the switching elements comprise signal duplexers with three ports.

16. The test method according to claim 10, wherein the measurement antenna system comprises an antenna array with a plurality of measurement antenna elements, and wherein the test method comprises individually switching the measurement antenna elements from a test mode to a communication mode to simulate the link antenna.

17. The test method according to claim 10, comprising carrying the device under test and controllably rotating and/or translating the device under test.

18. The test method according to claim 10, comprising moving the link antenna around the device under test on a circular circumference or on a spherical circumference.

* * * * *